United States Patent
Kurth

(10) Patent No.: US 9,863,518 B2
(45) Date of Patent: Jan. 9, 2018

(54) DIFFERENTIAL GEARING, IN PARTICULAR AXLE GEARING

(71) Applicant: Schaeffler Technologies AG & Co. KG, Herzogenaurach (DE)

(72) Inventor: Franz Kurth, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 40 days.

(21) Appl. No.: 15/030,171

(22) PCT Filed: Sep. 19, 2014

(86) PCT No.: PCT/DE2014/200489
§ 371 (c)(1),
(2) Date: Apr. 18, 2016

(87) PCT Pub. No.: WO2015/062598
PCT Pub. Date: May 7, 2015

(65) Prior Publication Data
US 2016/0265640 A1  Sep. 15, 2016

(30) Foreign Application Priority Data
Oct. 31, 2013 (DE) .................. 10 2013 222 233

(51) Int. Cl.
| | |
|---|---|
| B60K 6/365 | (2007.10) |
| F16H 48/11 | (2012.01) |
| F16H 48/10 | (2012.01) |
| F16H 37/08 | (2006.01) |
| F16H 3/66 | (2006.01) |

(52) U.S. Cl.
CPC ............. *F16H 48/10* (2013.01); *F16H 3/66* (2013.01); *F16H 37/082* (2013.01); *F16H 2048/104* (2013.01); *F16H 2048/106* (2013.01)

(58) Field of Classification Search
CPC ............................... B60K 6/365; F16H 48/11
See application file for complete search history.

(56) References Cited

U.S. PATENT DOCUMENTS

| | | | |
|---|---|---|---|
| 5,845,732 A | 12/1998 | Taniguchi et al. | |
| 6,098,737 A * | 8/2000 | Aoki ................ | B60K 6/365 180/242 |
| 7,500,933 B2 * | 3/2009 | Baasch ............. | B60K 17/3505 475/150 |

(Continued)

FOREIGN PATENT DOCUMENTS

AT            509721 A4    11/2011

*Primary Examiner* — Tisha Lewis
(74) *Attorney, Agent, or Firm* — Simpson & Simpson, PLLC

(57) ABSTRACT

An epicyclic gearing for splitting output drive power from a power input to a first power output and a second power output, comprising a superposition gearing stage, including a first sun gear, a first planetary gear set, a first planetary carrier, and a first ring gear, and a reverse gearing stage, including a second sun gear, a second planetary gear set, a second planetary carrier, and a second ring gear, wherein, the superposition gearing stage and the reverse gearing stage are kinematically coupled, and the epicyclic gearing is operatively arranged to operate in a first switching state or a second switching state, wherein the first switching state and the second switching state have different gear ratios.

12 Claims, 1 Drawing Sheet

(56) References Cited

U.S. PATENT DOCUMENTS

| | | | |
|---|---|---|---|
| 8,182,386 B2* | 5/2012 | Rosemeier | B60K 6/52 475/150 |
| 8,795,124 B2 | 8/2014 | Oberaigner | |
| 2013/0102431 A1* | 4/2013 | Doleschel | F16H 3/54 475/151 |
| 2015/0065282 A1* | 3/2015 | Honda | B60K 6/365 475/6 |

* cited by examiner

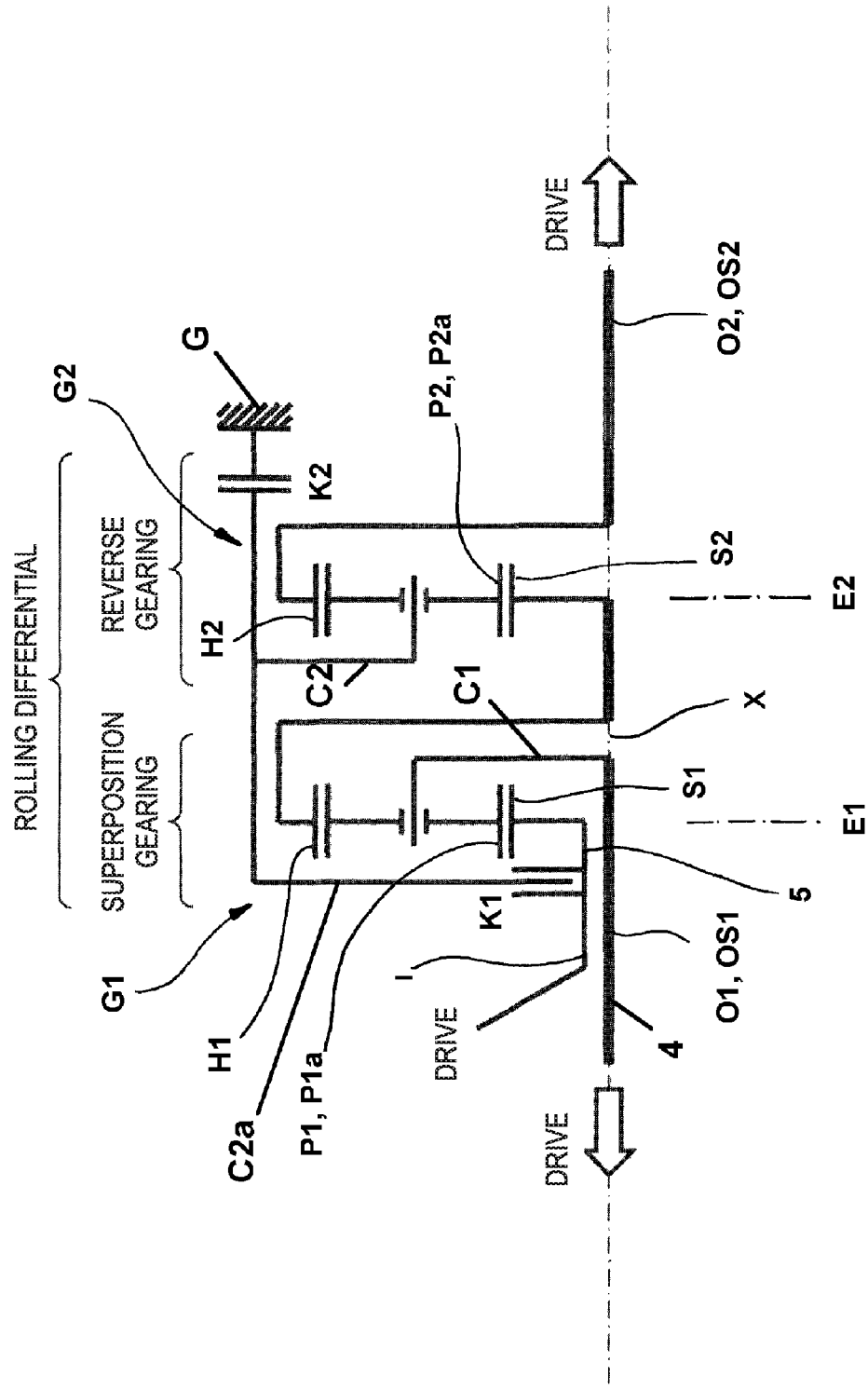

DIFFERENTIAL GEARING, IN PARTICULAR AXLE GEARING

CROSS-REFERENCE TO RELATED APPLICATIONS

The present application is the U.S. national stage application pursuant to 35 U.S.C. §371 of International Application No. PCT/DE2014/200489, filed Sep. 19, 2014, which application claims priority from German Patent Application No. DE 10 2013 222 233.5, filed Oct. 31, 2013, which applications are incorporated herein by reference in their entireties.

TECHNICAL FIELD

The invention relates to a differential gearing, in particular in the configuration of an axle gearing for the distribution of the drive power provided by drive equipment and supplied via a power input to a first and a second power output, whereby the gear ratio within the differential gearing is such that the power picked up at the two power outputs is at a level of output speed that is reduced with respect to the drive speed at the power input.

BACKGROUND

An epicyclic gearing of the aforementioned type is known from U.S. Pat. No. 5,845,732 A. Power splitting within the gearing is accomplished by a first planetary stage, which comprises a sun gear, a planetary carrier equipped with planets and a ring gear. The drive power provided by a motor is introduced into the gearing via the sun gear, which in this respect functions as a power input, and power splitting occurs on the planetary carrier as well as on the ring gear. The planetary carrier is coupled to a first output shaft. The ring gear is coupled to the sun gear of the second gearing stage. The second gearing stage comprises a stationary ring gear and a planetary carrier equipped with dual planets. This planetary carrier is coupled to a second output shaft.

SUMMARY

The invention is a differential gearing, in particular in the form of an axle gearing, which is characterized by a cost-effectively realizable and robust structure, and the kinematic effect of which can advantageously be adjusted to suit the respective operational status of a corresponding motor vehicle.

The previously mentioned task is inventively solved by an epicyclic gearing for the purpose of splitting the drive power present at a power input to a first and to a second power output, with: a superposition gearing stage, which comprises a first sun gear, a first planetary gear set, a first planetary carrier and a first ring gear, and a reverse gearing stage, which comprises a second sun gear, a second planetary gear set, a second planetary carrier and a second ring gear, whereby the superposition gearing stage and the reverse gearing stage are kinematically coupled, and the epicyclic gearing is configured in such a way that it is operable in a first and a second switching state, and the first and the second switching state differ with respect to the resulting overall gear ratio between the power input and the power outputs.

This advantageously allows the creation of an axle differential that, in addition to balanced power splitting, allows output of the drive power to both output shafts in a first mode of operation, as well as with relative to the first mode of operation significantly increased output torque in a second mode of operation, as needed.

In accordance with a particularly preferred embodiment of the invention, the epicyclic gearing is configured in such a way that a purely differential action without a gear ratio is provided in the first switching state. In the second switching state, the differential gearing functions as a so-called rolling differential gearing and effects a gear ratio to a slower speed (underdrive), i.e. an increase of the output torque with respect to the output torque in the first mode of operation.

In an example embodiment, the gearing is designed in such a way that shifting between the first and second switching state is effected by the second planetary carrier being coupled either to the power input or the gear housing in a torque-proof manner. The gearing is preferably constructed in such a way that the first sun gear functions as a power input, the first ring gear is coupled to the second sun gear in a torque-proof manner, the first planetary carrier constitutes the first power output, the second ring gear constitutes the second power output, and the second planetary carrier can be coupled, in a torque-proof manner, to the first sun gear via a first coupling device or to the gear housing via a second coupling device.

The coupling devices can be configured as coupling devices which connect in a positive-locking manner, or in particular also as coupling devices which connect in a friction-locking manner. It is in particular possible to configure the coupling device provided for effecting the purely differential operation and connecting the second planetary carrier to the gearing input as a positive-locking coupling device, and to configure the second coupling device, relevant for the gear ratio mode, as a friction-locking coupling device, which if necessary also acts as an overload clutch and, if a constructively specified maximum torque is exceeded, enters into a slipping state.

In an example embodiment, the gearing according to the invention is constructed in such a way that the partial gear ratio of the superposition gearing and the partial gear ratio of the reverse gearing are matched to one another in such a way that a symmetrical torque distribution to the two power outputs results. For this purpose, it is possible to configure the first and the second ring gear in such a way that these two gearing components exhibit the same number of teeth. The planets of the first and second planetary gear sets can likewise be configured to exhibit the same number of teeth. The first sun gear and the second sun gear can also exhibit the same number of teeth.

In an example embodiment, the superposition gearing and the reverse gearing are respectively designed as a spur gearing, and the first and the second sun gear are coaxially disposed to a gear axle in axially successive rolling planes. The power pick-up from the first planetary carrier is preferably accomplished via a shaft journal which is passed coaxially through the first sun gear. The first sun gear can be mounted on said shaft journal via a bearing arrangement, in particular a roller bearing assembly.

In an example embodiment, the power supply to the first sun gear occurs via a drive wheel that is axially offset to the first sun gear and on the same axis as the first sun gear, which is realized as a sprocket, a bevel gear or a spur gearing or also as a disc of a traction drive. The drive wheel is either configured as an integral part of the first sun, or coupled to it via a gearing component that is realized as a hollow shaft journal.

The second power output preferably comprises a second output shaft that is connected to the second ring gear in a torque-proof manner. A bearing journal or some other bearing support can be provided by way of this second output shaft, via which the second sun gear can be radially mounted. It is furthermore preferable that the second ring gear is also mounted in the gear housing by means of a roller bearing assembly.

The first planetary stage functions as a true epicyclic gearing, which effects a splitting of power to the first planetary carrier and the first ring gear. In the event that the second planetary carrier is fixed to the gear housing, the reverse gearing stage functions as a spur gear reverse gearing with a gear ratio effect "to a slower speed (underdrive)".

The superposition gearing stage and the second planetary gearing stage can be configured in such a way that they exhibit identical stationary gear ratios. In doing so it advantageously becomes possible to manufacture the two sun gears, the planetary gears of the two planetary gear sets, and if necessary also the two ring gears, as identical components, at least with respect to the corresponding tooth geometries and the pitch circle diameter.

BRIEF DESCRIPTION OF THE DRAWINGS

Various embodiments are disclosed, by way of example only, with reference to the accompanying drawing in which corresponding reference symbols indicate corresponding parts, in which:

FIG. 1 is a schematic view of an epicyclic gearing of the present invention which can be operated in two different modes of operation.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

In the form of a schematic diagram, the depiction according to FIG. 1 shows an example embodiment of an epicyclic gearing according to the invention, realized here as an axle gearing for a motor vehicle. This inventive epicyclic gearing serves to split the drive power present at power input I to first and second power output O1, O2. The epicyclic gearing comprises superposition gearing G1, which includes first sun gear S1, first planetary gear set P1, first planetary carrier C1 and first ring gear H1.

The epicyclic gearing further comprises reverse gearing stage G2, which includes second sun gear S2, second planetary gear set P2, second planetary carrier C2 and second ring gear H2. First sun gear S1 functions as a power input, or is non-rotatably coupled to the power input. The epicyclic gearing according to the invention is characterized in that superposition gearing G1 and reverse gearing stage G2 are kinematically coupled, and the epicyclic gearing is configured in such a way that it is operable in a first and in a second switching state, whereby the first and the second switching state differ with respect to the resulting overall gear ratio between power input I and power outputs O1, O2.

In the first switching state a purely differential action without a gear ratio is provided. In the second switching state the differential gearing is operated as a rolling differential gearing, causing a gear ratio to a slower speed (underdrive). Shifting between the first and the second switching state is effected by second planetary carrier C2 being non-rotatably coupled either to power input I via first coupling device K1 or to gear housing G via second coupling device K2.

Power input I is non-rotatably coupled to first sun gear S1 of superposition gearing stage G1. First ring gear H1 is permanently non-rotatably coupled to second sun gear S2. First planetary carrier C1 directly drives first power output O1. Second ring gear H2 directly drives second power output O2.

The switching option according to the invention is achieved in that second planetary carrier C2 is operatively arranged to non-rotatably coupled to first sun gear S1 via first coupling device K1 or to gear housing G via second coupling device K2. First and/or second coupling devices K1, K2 are exemplified here as multi-plate clutch devices which connect in a friction-locking manner. They can, however, also be configured as coupling devices which connect in a positive-locking manner.

The partial gear ratio of superposition gearing and the partial gear ratio of reverse gearing G2 are matched to one another in such a way that a symmetrical torque distribution to power outputs O1, O2 results.

In an example embodiment, first and second ring gear H1, H2 exhibit the same number of teeth. Planets P1a, P2a of first and second planetary gear sets P1, P2 likewise exhibit the same number of teeth. First sun gear S1 and second sun gear S2 also exhibit the same number of teeth. Superposition gearing G1 and reverse gearing G2 are respectively designed as a spur gearing, whereby first and second sun gear S1, S2 are coaxially disposed to gear axle X in axially successive rolling planes E1, E2. The power pick-up from first planetary carrier C1 is accomplished via shaft journal 4, which is passed coaxially through first sun gear S1.

The propulsion of first sun gear S1 occurs via hollow shaft journal 5. Hollow shaft journal 5 is driven by means of an input gear (not shown). In an example embodiment, the input gear can be a sprocket and driven by a drive chain, which establishes a kinematic connection between the epicyclic gearing and upstream gearing, in particular an automatic or manual transmission, or where appropriate also an electromechanical drive.

In an example embodiment, first coupling device K1 is positioned operatively arranged on hollow shaft journal 5, allowing the coupling of second planetary carrier C2 to hollow shaft journal 5. Bell structure C2a, which overlaps first ring gear H1, is provided between first coupling device K1 and second planetary carrier C2. The torque pick-up from first planetary carrier C1 to output shaft OS1 occurs in an interior region lying between gearing planes E1, E2.

The propulsion of second power output O2 occurs via the coupling of a drive shaft OS2, representing this power output, to second ring gear H2. It should be appreciated that the gearing components can be centered and braced against one another by means of numerous bearing points realized in the interior of the gearing. For example, first sun gear S1 and output shaft OS1 can be radially braced against one another by a needle bearing. Output shaft OS1 and the structure (not show supporting first ring gear H1 and second sun gear S2 can be centered in relation to one another via a bearing point, for example, by an end section of output shaft OS1 being radially braced by means of a roller bearing in the disc body supporting first ring gear H1. Second sun gear S2 and second output shaft OS2 can likewise be radially braced against one another by a roller bearing.

The unit represents a combination of differential and final drive ratio stages. The differential can be used in the area of the drive axle, when an additional gear ratio is temporarily called for.

In order to operate the gearing according to the invention in a purely differential gearing mode without an additional gear ratio effect, coupling device K1 is closed and coupling device K2 is opened. In this switching state, second planetary carrier C2 is coupled to power input and first sun gear S1 in a torsionally rigid manner. The two gearing stages G1 and G2 ensure that output shafts OS1, OS2 are reversely rotatably coupled to one another, and are thus carried along by the second planetary carrier C2 with a symmetrical distribution of torque.

The gearing mechanics provided by gearing stages G1, G2 is a pure splitting differential without an additional gear ratio effect.

In order to operate the gearing according to the invention as a rolling differential in high gear ratio mode, first coupling device K1 is opened and second coupling device K2 is closed. Second planetary carrier C2 is then non-rotatably coupled to gearing housing G. Reverse gearing stage G2 now functions as a spur gearing stage with a gear ratio to a slower speed (underdrive). First sun gear S1 engages radially from the inside into planets P1a of first planetary gear set P1. Planets P1a in turn engage radially from the inside into first ring gear H1. First ring gear H1 drives second sun gear S2. Second sun gear S2 engages radially from the inside into planets P2a of second planetary gear set P2. Planets P2a engage radially from the inside into second ring gear H2. This again results in a reversely rotatable coupling of output shafts OS1, OS2, which yields, however, with respect to the input I or rather first sun gear S1, a resulting gear ratio effect to a slower speed (underdrive) with continued symmetrical torque distribution.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An epicyclic gearing for splitting output drive power from a power input to a first power output and a second power output, comprising:
   a superposition gearing stage, comprising:
      a first sun gear;
      a first planetary gear set;
      a first planetary carrier non-rotatably connected to the first power output; and,
      a first ring gear; and,
   a reverse gearing stage, comprising:
      a second sun gear non-rotatably connected to the first ring gear;
      a second planetary gear set;
      a second planetary carrier; and,
      a second ring gear non-rotatably connected to the second power output;
   wherein, the superposition gearing stage and the reverse gearing stage are kinematically coupled, and the epicyclic gearing is operatively arranged to operate in a first switching state or a second switching state, wherein the first switching state and the second switching state have different gear ratios.

2. The epicyclic gearing recited in claim 1, wherein the first switching state is a purely differential motion without an added gear ratio.

3. The epicyclic gearing recited in claim 2, wherein in the second switching state, the epicyclic gearing operates as a rolling differential gearing and includes a slower speed gear ratio.

4. The epicyclic gearing recited in claim 3, wherein shifting between the first switching state and second switching state occurs when the second planetary carrier is coupled to either the power input or non-rotatably coupled to the gear housing.

5. The epicyclic gearing device recited in claim 1, wherein the first sun gear is driven by the power input, and the second planetary carrier is operatively arranged to be non-rotatably coupled to the first sun gear via a first coupling device or to the gear housing via a second coupling device.

6. The epicyclic gearing device recited in claim 5, wherein the first and/or second coupling devices couple in a positive-locking manner.

7. The epicyclic gearing device recited in claim 5, wherein the first and/or second coupling devices couple in a friction-locking manner.

8. The epicyclic gearing device recited in claim 1, wherein a partial gear ratio of the superposition gearing stage and a partial gear ratio of the reverse gearing stage sync with another, providing a symmetrical torque distribution to the first power output and the second power output.

9. The epicyclic gearing device recited in claim 1, wherein the first ring gear and the second ring gear include the same number of teeth.

10. The epicyclic gearing device recited in claim 1, wherein the superposition gearing stage and the reverse gearing stage are spur gearings, and the first sun gear and the second sun gear are coaxially arranged on a gear axle in axially successive rolling planes.

11. An epicyclic gearing for splitting output drive power from a power input to a first power output and a second power output, comprising:
   a superposition gearing stage, comprising:
      a first sun gear;
      a first planetary gear set;
      a first planetary carrier; and,
      a first ring gear; and,
   a reverse gearing stage, comprising:
      a second sun gear;
      a second planetary gear set;
      a second planetary carrier; and,
      a second ring gear;
   wherein:
      the superposition gearing stage and the reverse gearing stage are kinematically coupled, and the epicyclic gearing is operatively arranged to operate in a first switching state or a second switching state; and,
      the second planetary carrier is operatively arranged to be non-rotatably coupled to the first sun gear via a first coupling device or to the gear housing via a second coupling device.

12. An epicyclic gearing for splitting output drive power from a power input to a first power output and a second power output, comprising:
- a superposition gearing stage, comprising:
    - a first sun gear;
    - a first planetary gear set;
    - a first planetary carrier; and,
    - a first ring gear; and,
- a reverse gearing stage, comprising:
    - a second sun gear;
    - a second planetary gear set;
    - a second planetary carrier; and,
    - a second ring gear;
- wherein:
    - the epicyclic gearing is operatively arranged to operate in a first switching state or a second switching state;
    - the first switching state is a purely differential motion without an added gear ratio, and in the second switching state, the epicyclic gearing operates as a rolling differential gearing and includes a slower speed gear ratio than the first switching state; and,
    - shifting between the first switching state and second switching state occurs when the second planetary carrier is coupled to either the power input or non-rotatably coupled to the gear housing.

* * * * *